UNITED STATES PATENT OFFICE.

RICHARD LAUCH AND CARL KREKELER, OF ELBERFELD, GERMANY, ASSIGNORS TO THE FARBENFABRIKEN, VORMALS FR. BAYER & CO., OF SAME PLACE.

REDDISH-BLUE AZO DYE.

SPECIFICATION forming part of Letters Patent No. 502,369, dated August 1, 1893.

Application filed February 6, 1893. Serial No. 461,244. (Specimens.) Patented in England May 18, 1889, No. 8,299; in France October 21, 1889, No. 198,521; in Germany November 10, 1889, No. 58,271, and in Italy February 28, 1891, XXV, 29,265, LVII, 442.

*To all whom it may concern:*

Be it known that we, RICHARD LAUCH and CARL KREKELER, chemists, doctors of philosophy, (assignors to the FARBENFABRIKEN, VORMALS FR. BAYER & CO., of Elberfeld,) subjects of the Emperor of Germany, residing at Elberfeld, Germany, have invented a new and useful Improvement in the Manufacture of Azo Dye-Stuffs, (for which the aforesaid FARBENFABRIKEN has already obtained Letters Patent in the following countries: Germany, No. 58,271, dated November 10, 1889; England, No. 8,299, dated May 18, 1889; France, No. 198,521, dated October 21, 1889, and Italy, Vol. XXV, No. 29,265, and Vol. LVII, No. 442, dated February 28, 1891,) of which the following is a specification.

Our invention relates to the production of a new azo coloring-matter by combining equal molecular proportions of beta naphtholcarbonic acid (melting at 216° centigrade) and the diazo compound of amidosalicylic acid.

In carrying out our process practically we proceed as follows: A solution in water of 1.53 kilos, by weight, of paramidosalicylic acid is mixed with a watery solution of 0.7 kilos, by weight, of sodium nitrite and, after cooling by ice, hydrochloric acid is slowly added, until the liquid shows a lasting acid reaction. The diazo derivative of amidosalicylic acid which is formed in this manner separates as a fine crystal powder. When after some time the diazotization is finished, the diazo product is filtered off, washed and added, with continuous stirring, to a cold solution prepared by dissolving 1.88 kilos, by weight, of beta naphtholcarbonic acid (melting at 216° centigrade) in a small excess of diluted soda-lye, taking care that the reaction remains alkaline during the whole operation. After some days standing the combination is finished. Acetic acid in a small excess is added and the difficultly soluble dye-stuff separates. It is then filtered off, pressed and may directly be employed (as paste) without previously drying.

Our new coloring-matter possesses according to its production the following composition:

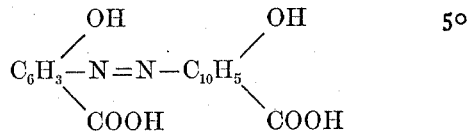

and forms after drying and pulverizing a greenish-black powder with metallic luster. It dissolves in water with reddish-brown color and is somewhat soluble in alcohol with bluish-red color. By ammonia, sodium carbonate and soda-lye the dry coloring matter is dissolved with difficulty, while the coloring-matter, when employed in pasty form, more easily dissolves in these solvents. It is insoluble in diluted hydrochloric and sulfuric acid. On adding to its watery solutions ammonia or sodium carbonate the color is not altered, while an addition of soda-lye to the watery solutions renders the color somewhat clearer. When its solutions in water are mixed with diluted hydrochloric or sulfuric acid, reddish-brown flakes are separated. By concentrated sulfuric acid it is dissolved with magenta-red color which is not altered on adding ice water to the sulfuric acid solution. It is most suitable for printing purposes and produces, when printed with chromium salts and a thickening on cotton goods, reddish-blue shades which are fast against the action of soaping.

Having thus described our invention and in what manner it can be performed, that which we claim as new, and desire to secure by Letters Patent, is—

1. The process for producing a new azo dye-stuff by combining equal molecular proportions of beta naphtholcarbonic acid (melting at 216° centigrade) and the diazo compound of amidosalicylic acid.

2. As a new product the azo coloring-matter having the formula:

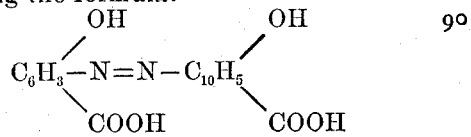

forming a greenish-black powder with metallic luster, soluble in water with reddish brown color, which is not changed on addition of ammonia or sodium carbonate, while an addition of soda-lye to the aqueous solution renders it clearer, and on addition of dilute hydrochloric or sulfuric acid causes a reddish-brown precipitate; difficultly soluble in ammonia, sodium carbonate and soda-lye if the dry powder is used, and easier when the coloring matter is treated in the form of a paste; difficultly soluble in alcohol with bluish-red color; insoluble in dilute hydrochloric and sulfuric acid; soluble in concentrated sulfuric acid with a magenta red color, which is not altered on addition of ice water; producing when printed with chromium mordants on cotton reddish-blue shades fast against soap; and having the properties substantially as specified.

In testimony whereof we have signed our names in the presence of two subscribing witnesses.

RICHARD LAUCH.
CARL KREKELER.

Witnesses:
WM. ESSENWEIN,
RUDOLPH FRICKE.